US010574535B2

(12) United States Patent
Khojastepour et al.

(10) Patent No.: US 10,574,535 B2
(45) Date of Patent: Feb. 25, 2020

(54) INTERFERENCE TOPOLOGY INFERENCE TO ENHANCE PERFORMANCE OF LTE UNLICENSED NETWORKS

(71) Applicant: NEC Laboratories America, Inc., Princeton, NJ (US)

(72) Inventors: Mohammad Khojastepour, Lawrenceville, NJ (US); Karthikeyan Sundaresan, Manalapan, NJ (US); Eugene Chai, Monmouth Junction, NJ (US); Sampath Rangarajan, Brdgewater, NJ (US)

(73) Assignee: NEC Corporation (JP)

( * ) Notice: Subject to any disclaimer, the term of this patent is extended or adjusted under 35 U.S.C. 154(b) by 55 days.

(21) Appl. No.: 16/043,665

(22) Filed: Jul. 24, 2018

(65) Prior Publication Data

US 2019/0036786 A1 Jan. 31, 2019

Related U.S. Application Data

(60) Provisional application No. 62/538,777, filed on Jul. 30, 2017.

(51) Int. Cl.

*H04L 12/24* (2006.01)
*H04W 24/08* (2009.01)
*H04W 24/02* (2009.01)

(52) U.S. Cl.

CPC ............ *H04L 41/12* (2013.01); *H04L 41/142* (2013.01); *H04W 24/02* (2013.01); *H04W 24/08* (2013.01)

(58) Field of Classification Search

CPC ...... H04L 41/12; H04L 41/142; H04W 24/02; H04W 24/08

See application file for complete search history.

(56) References Cited

U.S. PATENT DOCUMENTS

| | | | |
|---|---|---|---|
| 9,332,465 B2 | 5/2016 | Valliappan et al. | |
| 9,806,836 B2 | 10/2017 | Sadek et al. | |
| 2015/0126207 A1* | 5/2015 | Li | H04W 16/14 455/452.1 |
| 2015/0173056 A1 | 6/2015 | Yerramalli et al. | |
| 2016/0128080 A1 | 5/2016 | Verma et al. | |
| 2016/0135148 A1 | 5/2016 | Novlan et al. | |
| 2017/0071011 A1 | 3/2017 | Jin et al. | |
| 2017/0195081 A1 | 7/2017 | Yerramalli et al. | |
| 2019/0020570 A1* | 1/2019 | Wu | H04L 45/26 |

* cited by examiner

*Primary Examiner* — Afshawn M Towfighi
(74) *Attorney, Agent, or Firm* — Joseph Kolodka

(57) ABSTRACT

A method implemented in wireless communication systems for finding a topology of a network of communication nodes is presented. The method includes defining a set of the communication nodes as measurement nodes that identify if a channel is available or occupied at a particular time, determining, via a central controller that has access to measurements of at least one measurement node of the measurement nodes, a probability of availability or occupancy of the channel for the at least one measurement node and determining a joint probability of availability or occupancy of the channel for multiple measurement nodes for which a measurement is available, and computing, via a central decision device, the network topology from the determined probabilities.

20 Claims, 8 Drawing Sheets

Base Station

101

100

101

101

105

103

103

□ MS: LTE UEs

○ HS: Hidden WiFi Terminals

400

INTERFERENCE TOPOLOGY INFERENCE TO ENHANCE PERFORMANCE OF LTE UNLICENSED NETWORKS

RELATED APPLICATION INFORMATION

This application claims priority to Provisional Application No. 62/538,777, filed on Jul. 30, 2017, incorporated herein by reference in its entirety.

BACKGROUND

Technical Field

The present invention relates to long-term evolution (LTE) communications and, more particularly, to methods and systems for implementing interference topology inference to enhance performance of LTE unlicensed networks.

Description of the Related Art

To address the increasing demand for additional long-term evolution (LTE) spectrum, there is growing interest and support to operate LTE in the unlicensed band in conjunction with operations in the licensed spectrum. Accordingly, an LTE node operating in the unlicensed spectrum is needed to implement an asynchronous channel access mechanism that includes both energy sensing and back-off to ensure fair co-existence with the incumbent WiFi. Traditional network providers have started rolling out licensed assisted access (LAA) technology. In addition, there is also an effort by green-field providers to develop a standalone LTE specification that can operate LTE entirely in the unlicensed band without any assistance from the licensed spectrum for use in private LTE networks.

SUMMARY

A method implemented in wireless communication systems for finding a topology of a network of communication nodes is presented. The method includes defining a set of the communication nodes as measurement nodes that identify if a channel is available or occupied at a particular time, determining, via a central controller that has access to measurements of at least one measurement node of the measurement nodes, a probability of availability or occupancy of the channel for the at least one measurement node and computing a joint probability of availability or occupancy of the channel for multiple measurement nodes for which a measurement is available, and computing, via a central decision device, the network topology from the determined probabilities.

A system for finding a topology of a network of communication nodes is also presented. The system includes a set of the communication nodes defined as measurement nodes that identify if a channel is available or occupied at a particular time, a central controller that has access to measurements of at least one measurement node of the measurement nodes, the central controller determining a probability of availability or occupancy of the channel for the at least one measurement node and computing a joint probability of availability or occupancy of the channel for multiple measurement nodes for which a measurement is available, and a central decision device that computes the network topology from the determined probabilities.

A non-transitory computer-readable storage medium comprising a computer-readable program is presented for finding a topology of a network of communication nodes, wherein the computer-readable program when executed on a computer causes the computer to perform the steps of defining a set of the communication nodes as measurement nodes that identify if a channel is available or occupied at a particular time, determining, via a central controller that has access to measurements of at least one measurement node of the measurement nodes, a probability of availability or occupancy of the channel for the at least one measurement node and computing a joint probability of availability or occupancy of the channel for multiple measurement nodes for which a measurement is available, and computing, via a central decision device, the network topology from the determined probabilities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The lack of adequate spectrum to meet the envisioned demands of 5G applications and services like autonomous transport, augmented reality/virtual reality (AR/VR), etc., has resulted in a significant interest in enabling cellular long-term evolution (LTE) operation in unlicensed spectrum bands. However, LTE being a synchronous, centrally (base station (BS)) controlled access technology that was designed for licensed spectrum, faces several challenges when moved to the unlicensed spectrum. One hurdle arises from the presence of unknown, un-controlled interference that is common to the unlicensed spectrum.

Figure 1:
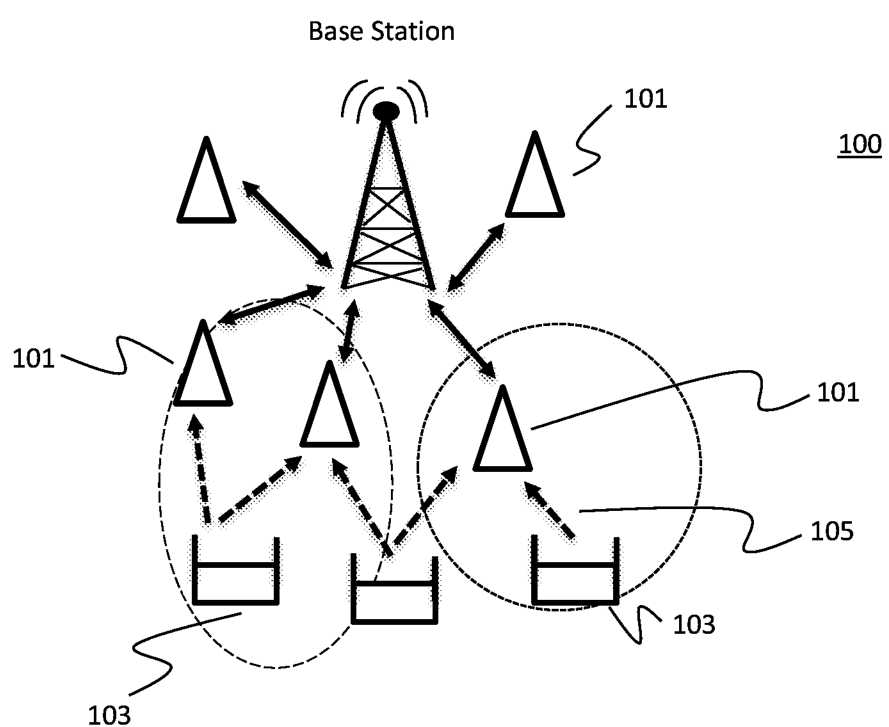
FIG. 1 is a block/flow diagram illustrating a base station communicating with clients, in accordance with embodiments of the present invention.

In the case of access technology (WiFi) operating in the unlicensed spectrum, every node (BS and client) is responsible for its own channel access subject to its perceived interference. In contrast, LTE's access and scheduling decisions on both downlink and uplink are executed by the base station alone and thus do not account for interference at the clients 101 (FIG. 1; 100). This can have an impact on LTE's operation in the unlicensed spectrum, which can not only degrade its access performance but can also lead to security threats in the form of jamming and disrupted operations 105. Thus, to counter such detrimental effects, it becomes necessary for the LTE BS to characterize the interference experienced by its clients but not directly observed by it (i.e., hidden from BS) in a standards-compliant manner.

In characterizing this interference, the issue is transformed into one of topology inference in wireless networks. Specifically, the interest is in not only identifying the number of external nodes 103 (hidden from the BS) interfering with the clients but more comprehensively the interference graph itself, which captures the interference impact of specific hidden nodes on various clients along with their access distribution. Such a characterization not only helps the BS improve its access performance by making more informed decisions about which unlicensed channel to select for operation and which clients to schedule on a channel, but also identifies and isolates rogue BSs and transmitters that are not supposed to be operating/jamming on a channel in private deployments.

The issue of topology inference is an actively investigated problem in wired networks (and to some extent in wireless sensor networks), where users are interested in identifying lossy links for a given multi-hop network topology from just end-end measurements. The harder version of the issue, which is to identify the topology itself has been investigated from a "stochastic" perspective, where users attempt to converge to the underlying topology in distribution. In contrast, topology inference in wireless networks presents both an opportunity and a challenge. On one hand, the inference of a single-hop network topology (FIG. 2; 200) is of concern, which should be simpler than a multi-hop network topology.

However, to be practically useful in channel access and security decisions, it is no longer of interest to merely estimate the topology in distribution, but instead, "deterministic" algorithms would be of interest that can aid in characterizing the actual interference topology. This would require to not only identify a set of unknown hidden terminals and their access distributions that cause interference to clients (FIG. 2; 200), but also the specific interference dependencies 205 between the hidden terminals 203 and the clients 201. This makes topology inference challenging in wireless networks.

Towards addressing this challenge, the exemplary embodiments of the present invention characterize the topology inference problem as a function of the measurement overhead incurred by the base stations. In particular, the method leverages the measurement capabilities offered by wireless networks to develop a novel analytical framework for such a characterization, and design optimal algorithms for topology inference that account for measurement overhead constraints. Specifically, the methods:

Formulate the problem of finding the topology in a bipartite graph of communication nodes between a set of hidden nodes and measurement nodes where only the measurement nodes are available to find information about the channel access.

Find the probability of occurrence of each hidden nodes under two conditions: (1) where all hidden nodes are in one contention domain which means only one can transmit at a time, and (2) where hidden nodes are all in different contention domains where the probability of one hidden node being active is independent of other hidden nodes.

Provide the optimal solution where the measurement from all measurement nodes can be accessed simultaneously. This case is referred to as M-th order statistics where M is the number of the measurement nodes Provide a solution where only k-th order statistics from the measurement nodes are available, etc.

To minimize the overhead of the measurement, 2-nd order statistics are considered and a thorough insight into the solution is provided, that is, (1) provide a condition for the uniqueness of the solution, (2) provide a way to find all possible solutions for the case that the solution is not unique, and (3) prove that the solution with respect to the degrees of the measurement nodes is optimal with probability one. This means that even though the solution is not always optimal in the sense of the degree but in the probabilistic sense if in all possible cases the probability measurement of finding a solution with exact degree at the measurement nodes is one.

The intensive demands of 5G applications and services like autonomous transport, AR/VR, etc. has created a corresponding need for additional low frequency spectrum. This has prompted a move to launch cellular access technologies like LTE in the unlicensed spectrum. There is a lot of interest in helping LTE aggregate unlicensed bands along with its licensed bands through the LTE-LAA (License Assisted Access) 3rd generation partnership project (3GPP) standard as well as in launching LTE stand-alone in the unlicensed spectrum without the need for the licensed spectrum. Technologies in the unlicensed spectrum (WiFi being the dominant) usually allow each node (BS and client) to employ an asynchronous, channel sensing feature to gain access to the channel subject to its local interference. While LTE-LAA introduces some form of channel sensing (e.g., through energy detection) into LTE, LTE's fundamental mode of channel access is still synchronous (orthogonal frequency-division multiple access (OFDMA) across clients) and centralized, where it is completely driven by the BS, the BS being responsible for scheduling its downlink (DL) transmissions as well as its clients' uplink (UL) transmissions. This creates significant issues when deployed in the unlicensed spectrum, as the BS does not have information on the local interference perceived by its clients but is hidden to the BS itself. This not only impacts LTE's access in terms of DL and UL performance, but can also lead to security issues in the form of jamming and denial of service attacks on its clients.

Characterizing the interference perceived at the clients enables the BS to improve its access performance by evaluating various candidate channels for its unlicensed operation, and also helps the BS spatially localize (at a coarse level) the origin of interference when a security threat arises. Being critical to LTE's operation in the unlicensed spectrum, this in turn motivates the need for interference topology inference in such wireless networks.

Formally, the issue can be stated as follows.

Figure 3:
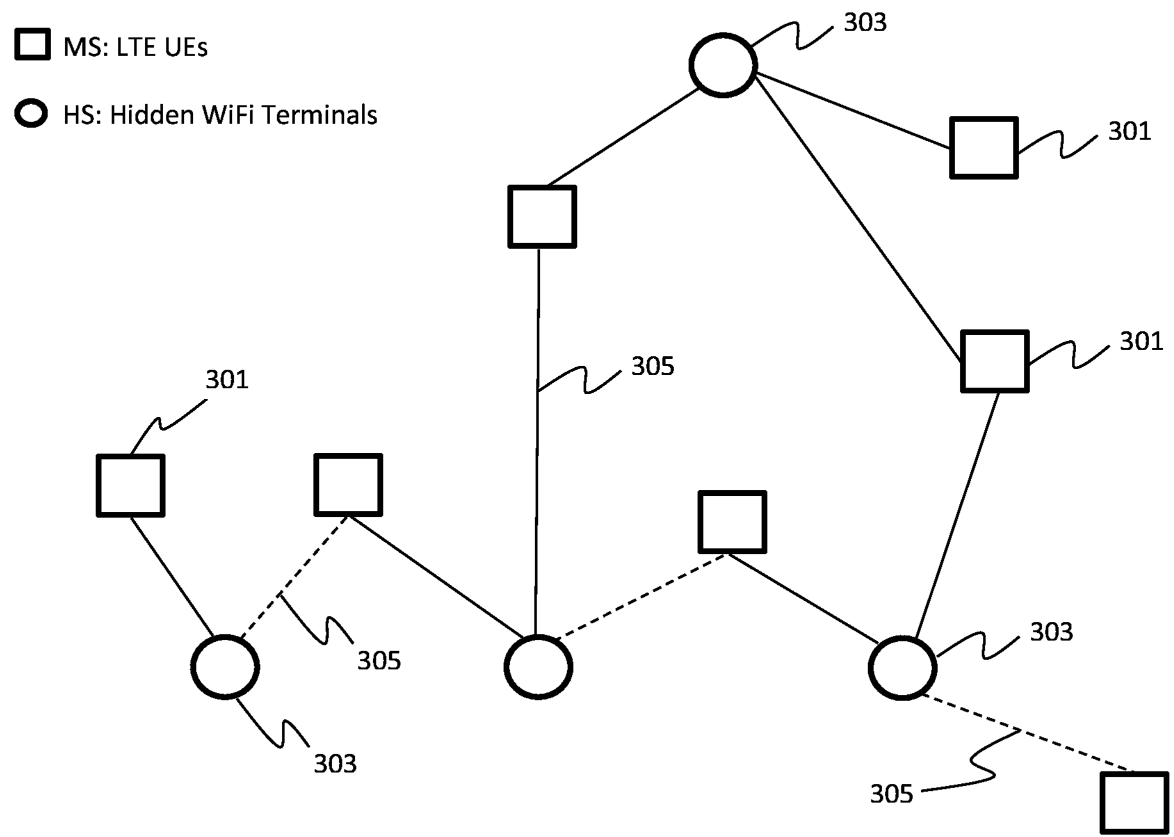
FIG. 3 is a block/flow diagram illustrating a physical graph of user equipment (MS nodes) and interfering nodes (HS nodes) in an exemplary long term evolution (LTE) network, in accordance with embodiments of the present invention.
Figure 4:
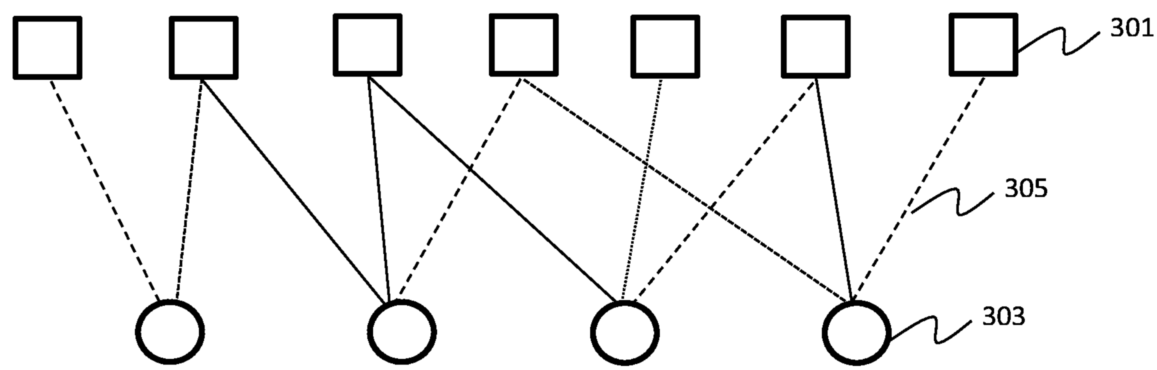
FIG. 4 is a block/flow diagram illustrating a logical bipartite graph of communication nodes in FIG. 3, in accordance with embodiments of the present invention.

Given a set of clients associated with an LTE BS, the exemplary methods completely characterize the interference topology perceived by the clients (hidden to the BS). As shown in FIG. 3, this involves determining the set of hidden terminals 303, their access distributions, as well their interference dependencies 305 on specific clients 301. The physical scenario (FIG. 3; 300) logically corresponds to a bipartite graph that is equivalently depicted in FIG. 4; 400. In inferring this interference topology, the measurements available are channel access information at the clients, which can be collected on the DL (measured at the clients and fed back to the BS) or the UL (directly measured by BS). Since LTE allows for OFDMA, where multiple clients can be scheduled simultaneously or concurrently on different spectral resources, the method is able to collect simultaneous or concurrent access information of multiple clients. Consequently, the more such joint access information that is available, the better the accuracy of the estimated topology. However, since the collection of such access information constitutes overhead, the goal is to characterize the topology inference problem as a function of the measurement information that is available and design corresponding optimal algorithms for the inference itself.

Figure 2:
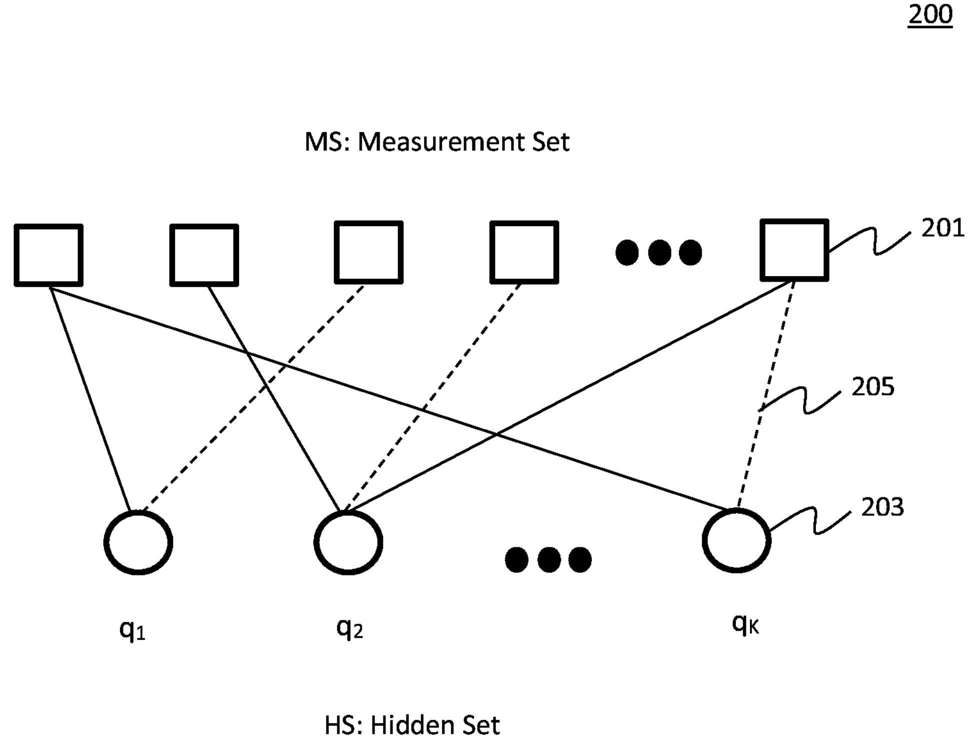
FIG. 2 is a block/flow diagram illustrating a bipartite graph of communication nodes, in accordance with embodiments of the present invention.

Consider a bipartite graph between two sets of nodes M and H. An example of such bipartite graph is depicted in FIG. 2. The set of nodes M are represented by squares on the top where M stands for measurement set. The status of the node in this set M is available. The set of nodes H denoted by circles on the bottom represents hidden nodes where the number of such nodes and the network topology is unknown. Each node represents a communication point. If two nodes are connected by an edge, it means that there is a potential interference between these nodes and they cannot transmit at the same time, but one can transmit and while transmitting it is heard by the other node that is connected to it. When some of the hidden terminals are transmitting, the nodes in the measurement set can sense the channel and their status represent if they are able to transmit or not which means that it becomes evident if there is a link between the nodes in the set H that are active at this time and each nodes in the measurement set M.

For a subset A of the measurement set M, $p_A$ is defined as the probability that exactly the nodes in the set A are able to transmit. A measurement status for all the nodes in the measurement set M may be denoted by a set A that includes only the nodes that are able to be active (can transmit). Alternatively, if the nodes are ordered, say if M={1, 2, 3, . . . , |M|}, the measurement status can be represented by a vector of 0 and 1, where 1 represents a node that receives interference and 0 represent interference free node. For a shorthand notation, the method can represent a set of status vectors by a vector where entry of the vectors are taken from the set {0, 1, x} and x means that this entry can be either 0 or 1, hence, such vector represents a set of all status vectors where entries of x are taken all possible combinations of 0 and 1. The probability for the measurement status denoted by set A can be denoted as $p_A$ or equivalently by spelling out the set in the subscript for shorthand notation.

For example if A={1, 2, 5}, $p_{125}$ can be written in lieu of $p_A$.

A node in H can have one of $2^{|M|}-1$ connections to at least one and at most |M| nodes in set M not counting the case that the hidden node has no connection to the set M in which case it is naturally not measurable and in turn irrelevant to the problem at hand. Hence, there are at most $2^{|M|}-1$ types of hidden nodes based on the topological network connections. Since this topological connection can be represented by a set $A \subset M$ or by the status vector, thus, the node itself can be represented by $h_A$ or equivalently by hs where s is the status vector corresponding to set A. The probability of this hidden node being active is denoted by $q_A$ or equivalently by qs.

Two different constraints on the probabilities of the hidden nodes can be considered: (1) the independent case: where each hidden node represented by status vector s is active (transmitting) with probability qs and the probability of hidden nodes being active is independent, and (2) the disjoint case: where only one node may be active at a time with probability qs. It can be argued that for either constraint, it is not possible to distinguish between two hidden nodes of the same status just based on the measurement. It is thus assumed that $q_A$ and $q'_A$ represent the probabilities of two hidden nodes that have the same status A. These nodes provide equivalent measurement probability for all possible measurement status types if they are replaced with a single node of the same status with probability of:

$$q_A(1-q'_A)+q'_A(1-q_A)+q_Aq'_A=q_A+q'_A-q_Aq'_A$$

for the independent case assumption or with a node with the same status and probability of $q_A+q'_A$ for the disjoint case. In fact, any more number of such nodes of the same status type can always collapse to a single node of the same status type. Hence, any solution presented is up to an inherent ambiguity of finding only one hidden node of a given status type. Although it may appear as a restriction in theory, however, in practice for most applications this ambiguity is not important. For example, if a user is only interested in finding out which set of nodes in M should or should not be scheduled together due to interference from hidden nodes, the problem is also blind to the fact that either one or more hidden nodes are causing the interference. Hence, the solution can provide the optimal view of the network topology in such cases.

It is clear that the probability of measured status s, i.e., ps is related to the probabilities of hidden nodes. In order to express this probability explicitly, the concept of cover is defined.

A cover for a set A is defined as a set of subsets of A such that their union is equal to A. A set of all possible covers are A is denoted by C(A). For the independent case constraint, the probability of the status vector s can be found based on the set 1(s) that is defined as the set of the indices of all elements of s that are equal to one. Thus:

$$p_s = \prod_{B \subset 2^M - \{\}} (1-q_B) \sum_{C \subset C(1(s))} \prod_{B \subset C} \frac{q_B}{1-q_B}. \tag{1}$$

For the disjoint case, it is often useful to consider the partial status vectors, that is a status vector that includes only k≤|M| entries that are either zero or one, and the other entries are x, which means that the status vector in fact represents a set of status vectors. Such status vector is called partial status vector of size k.

The probability of a partial status vector can be represented by:

$$p_s = \sum_{u, 1(u)=1(s), 0(u)=0(s)} q_u \tag{2}$$

where the set 0(s) and 1(s) are defined as the set of the indices of all elements of s that are equal to zero or one, respectively.

The probability of hidden nodes that are independent is considered next. Different measurement scenarios are considered and two special cases are described.

The first case is where the full order statistics, i.e., |M|-th order statistics, are available, and, thus, it is possible to fully determine the network topology and the associated probabilities of the hidden nodes being active.

The second case is where only 2-nd order statistics are available. For the latter case, it can be argued that the network topology can be found with probability 1, while the associated probabilities of the hidden nodes are not uniquely found.

Given that the first order statistics is unable to find the network topology the case of 2-nd order statistics is particularly important since all other cases of k-th order statistics for 2<k<|M| only improves the knowledge of the hidden node probability and the solution is not necessarily unique unless if k=|M|.

Therefore, the focus in these two cases is further detailed below.

|M|-th Order Statistics:

The case that the probability of all status vectors are available is considered. This means that the status of all M measurement nodes are available simultaneously or concurrently. Thus, it is possible to gather this information over time and by dividing the number of each status vectors over the total number of reading the method can empirically find the probability of each status vector by waiting long enough. The key to solving this case lies in the way that the probability of measurement status is expressed in (1).

For example:

$$\frac{p_s}{p_{s_0}} = \sum_{C \subset C(1(s))} \prod_{B \subset C} \frac{q_B}{1 - q_B} \tag{3}$$

since $\mathcal{C}(1(s_0))=\emptyset$ and therefore $$p_{s_0} = \prod_{B \subset 2^M - \{\}} (1 - q_B) \tag{4}$$

where $s_0$ is the status vector of all zero which means that every node in the measurement set is able to transmit.

It can be seen that the right hand side of (3) is a function of $q_B$ for all B that are the cover of set 1(s). Therefore, if the method starts with the vectors that only have one nonzero element, their probability qs is directly found. Moving to vectors that have only two nonzero elements, Equation (3) only has one variable now and the other values are known and thus their probabilities are found directly. This procedure successively finds each probability based on a single linear equation where the parameters of the equation are all known probabilities based on the solution of the prior equations.

2-nd Order Statistics:

In some embodiments, only up to the second order statistics can be measured due to access, scheduling, or time constrains or to simply reduce the overhead of the topology inference algorithm and the needed measurements. This situation happens particularly in LTE where only a limited number of user equipments (UE) may be scheduled. Therefore, by the second order statistics, it is meant that only up to the second order statistics is available.

First, the probability of partial status vectors based on the probabilities of the hidden nodes and the topology of the network is derived. It is noted that any topology is in fact realized by considering only probabilities of hidden nodes of all status types except the status type of all zero which means a hidden node that is not connected to any measurement node, which is the total of $2^{|M|}-1$ possible status type.

In particular, the probability of zero for a given status type means that such hidden node does not exist.

For a given partial status vector s, the probability of a partial status vector can be represented by:

$$p_s = \sum_{u, 1(u)=1(s), 0(u)=0(s)} q_u \tag{5}$$

where the set 1(s) and 0(s) are defined as the set of all elements of s that are equal to one or zero, respectively, and $p_u$ is given by (1). Therefore, $$p_s = \sum_{u, 1(u)=1(s), 0(u)=0(s)} \prod_{B \subset 2^M - \{\}} (1 - q_B) \sum_{C \subset C(1(u))} \prod_{B \subset C} \frac{q_B}{1 - q_B} \tag{6}$$

The above probability may be simplified for the case of 2nd order statistics as follows. Let ξi denote a partial status vector where only the position i is zero and other positions are x which means that it is the set of all vectors which have their i-th position as zero. Similarly, let ξij denote a partial status vector where only two positions i and j are zero and other positions are x, which means that it is the set of all vectors which have both their i-th and j-th position as zero. The probability of ξi can be computed as the probability that neither hidden node with status vector that has 1 in the i-th position should be active and due to independence assumption this probability is given by:

$$P(\xi_i) = \prod_{u, 1(u)=1(\xi_i)} (1 - q_u) \tag{7}$$

Similarly:

$$P(\xi_{ij}) = \prod_{u, 1(u)=1(\xi_{ij})} (1 - q_u) \tag{8}$$

Therefore, by taking the log from both sides, the above equations may be modified to summation instead of multiplication.

As a result:

$$-\log(P(\xi_{ij})) = \sum_{u, 1(u)=1(\xi_{ij})} -\log(1 - q_u) \tag{9}$$

and $$-\log(P(\xi_i)) = \sum_{u, 1(u)=1(\xi_i)} -\log(1 - q_u). \tag{10}$$

By defining:

$r_{ij}=-\log(P(\xi_{ij}))$, $r_i=-\log(P(\xi_i))$, and $q'_u=-\log(1-q_u)$

Which results in:

$$r_{ij} = \sum_{u,1(u)=1(\xi_{ij})} q'_u \tag{11}$$

and $$r_i = \sum_{u,1(u)=1(\xi_i)} q'_u. \tag{12}$$

The transformation of the probabilities for the partial status vectors has resulted in a formulation that transforms the independent case to the disjoint case for the special case of 2nd order statistics.

The result of the last two equations may be written in a matrix form as R=XT QX where $$X = \begin{bmatrix} t_1 \\ t_2 \\ \vdots \\ t_K \end{bmatrix} \tag{13}$$

and $t_i$ is a row vector that denotes the status vectors for different hidden nodes and the probability of that hidden node being active is $q_{ti}$. The matrix Q is a diagonal matrix wherein the (i, i)-th entry is equal to $q'_{t_i}$ and the (i, j)-th entries of matrix R (for i≠j) are given by $r_{ij}$ and the (i, i)-th entries of matrix R are given by $r_i$.

An algorithm that can always generate a solution for the problem for an arbitrary order statistics is introduced. The solution is in fact more general than the case of k-th order statistics and can encompass a case that the probabilities of any subset of partial status types $S=\{s_i, i\in\}1, \ldots, 2^{|M|}\}\}$ is given.

Note that the number of partial status types cannot exceed the number of possible status types and that is why there is a limit of at most $2^{|M|}$ on the size of the set S. In other words, suppose that in a generic sense the probabilities for more than $2^{|M|}$ status types or partial status types are given, if the probabilities are consistent, it is always possible to reduce them to a set that has cardinality of less than $2^{|M|}$. The outcome of the algorithm can confirm if the measured probabilities for these sets are in fact consistent and provide a solution or declare that the given probabilities are not consistent. The consistency condition means that there is a necessary conditions on the set S for the solution to exist. However, the proposed algorithm works under additional conditions that are referred to as sufficient conditions. Nonetheless, the solution for a given set S and its probabilities might not be unique.

An example of inconsistent case is where the probability of a partial status type ξij is nonzero while the probability of partial status type ξi is zero. A closer look reveals that if the set of status vectors denoted by a partial status vector u is a subset of the set of status vectors denoted by a partial status vector v, then the probability of partial status vector u cannot be greater than that of v, i.e., pv≤pu. In a shorthand notation, it is written as u⊂v to denote the set corresponding to u is the subset of the one corresponding to v. It is not hard to see the reason behind this necessary condition by examining (2) and noting that if u⊂v this means that 1(v)⊂1(u) and 0(v)⊂0(u) which means that the summation in right hand side of (2) over the set v contains the summation over the set of u.

Therefore, the following conditions apply:

In a first condition, the set S of partial status vectors and their corresponding probabilities are called consistent if and only if for any two partial status vector u and v in S such that u⊂v, then pv≤pu.

The algorithm successively takes the largest formal projection of the statistics for the set S into a given hidden state and strips off that projection from the probabilities and continues to the next step by choosing the next hidden state from the list. Thus, there is an ordering of the hidden states at the beginning before the successive projection takes place to create a list of status vectors.

The formal projection of the set of partial status vector S into a status vector s is defined as:

$$\mathbb{P}_s(S) = \min_{u\in S,1(u)=1(s),0(u)=0(s)} p_u. \tag{14}$$

This means that the method selects the lowest probability from the set S among the set of all partial status vectors that have zeros and ones in the same positions as the status vector s. The action of stripping off this projection includes updating all the probabilities for the elements of S as follows:

$$p_u = p_u - \mathbb{P}_s(S) \forall u \in S,\ 1(u)=1(s),\ 0(u)=0(s). \tag{15}$$

In the following, it is proven that this algorithm provides a solution to the problem at the termination or declares an error when the probabilities are not consistent. When the algorithm exhausts successive projections and strips off the probabilities for all the elements in the list, the final residual probabilities for all states should be zero and thus the selected status vectors with nonzero probabilities during the course of the algorithm provide a solution to the problem. However, if the final residual probabilities are not zero, then the algorithm declares inconsistent input.

It is proved that the algorithm works under the following condition. In other words, for the algorithm to work, an extra condition is needed to be satisfied in addition to the necessary condition. This means that this algorithm does not necessarily work for an arbitrary S unless if the following sufficiency condition holds. This sufficient condition holds true when k-th order statistics are available for an arbitrary value of k, as described further below.

Consider partial ordering of the set S into a list $(s_1, s_2, \ldots, s_{|S|})$ in non-decreasing subset order. This means that if $s_i \subset s_j$ then i≤j. A list of status vectors $l_i$'s denoted by $L=(l_1, l_2, \ldots)$ is called monotone decreasing with respect to a set S of partial status vectors if and only if $$\forall a,b,j: b<a, l_j\in s_a \Rightarrow l_j \in s_b, \text{ or } \nexists k, k>j: l_k \in s_b. \tag{16}$$

Note that the condition "if $s_i \subset s_j$ then i≤j" in the above definition does not imply that for any i≤j then $s_i \subset s_j$ as well.

In a second condition, the sufficient condition for the successive algorithm to correctly find a solution or declare inconsistent case for the set S of partial status vectors and their associated probabilities is (1) to be able to find a list L of all status vectors that is monotone decreasing with respect to a given partial non-decreasing ordering of the set S and (2) to have the necessary condition satisfied.

While a given set S and associated probabilities might not directly satisfy the sufficient condition, a modification of S to an equivalent (e.g., having exact same information) set S' and its associated probabilities can satisfy the sufficient condition. In the following, when the k-th order statistics case is described, a particular representation of S and generation of the list L that satisfy the sufficient condition will be explained. In fact, not any representation of the k-th order statistics automatically satisfies the sufficient condition.

Here, it is proven that the algorithm always provides a solution under the sufficient condition. After the algorithm is finished, the residual probabilities for the partial status vectors in set S has to be zero. If not, then there exist $s_i$ for which the residual probability is nonzero. First, it is noted that at each step the algorithm always deducts a value for a partial status vector that is not greater than the current residual probability in the current step due to the fact that the minimum of all such probabilities is calculated by the formal projection $\mathbb{P}_s(S)$.

Therefore, the residual probability for $s_i$ has to be positive. Among all such $s_i$, consider the one which has the lowest index i. Now, find the largest index of j in the list L such that $l_j \in s_i$. At the time of processing $l_j$ the formal projection $\mathbb{P}_{l_j}(S)$ has to be the current value of $pl_j$ otherwise there exist a value k>j which imposes stronger constraint and for which the $p_{l_k} < p_{l_j}$. Since $l_k$ has to be in $s_i$ as well, i.e., lk 2 si, this means that $pl_k < pl_j$ from the beginning since all the deductions from $pl_k$ and $pl_j$ in previous steps of the successive algorithm are the same. This is a contradiction. In simple words, it means that the algorithm takes away the reminder (if any) of what is left in probability for a given $s_i$ at the largest step j for which $l_j \in s_i$ happens.

Moreover, it is noted that status vectors in the successive algorithm may be chosen in different order that still satisfy the monotone decreasing property. Hence, the algorithm may possibly provide different solutions for different choosing orders. Another source of having a non-unique solution is the fact that the set S and its associated probabilities may be represented in different ways. For example, consider two partial status vector si and sj in S such that si$\subset$sj.

The complement of si with respect to sj can be a state $u = s_j - s_i = s_j \cap \bar{s}_i$ with the probability $p_u = p_{s_j} - p_{s_i}$. If u is in S, u can be removed with its associated probability and generate a new S. Or, if u does not belong to S, u can be added and $s_j$ can be removed which yet again generate a new S and its associated probabilities.

k-th Order Statistics

The application of the aforementioned algorithm is presented in finding a solution when the k-th order statistics for an arbitrary k are available. Any such statistics may be represented, e.g., by only considering the partial status vectors that have zeros in some positions and the rest of the positions are x. For example, ξi's and ξij's for all i and j represents the states for 2-nd order statistics. All other joint probabilities of observing any k measurement nodes at a time may be derived from these statistics. Thus, the first step of the algorithm is to represent the set S of elements ξA and their statistics where the set A indicates the indices of zeros in the status vector ξA and the rest of the elements of the vector are x. Hence, for the k-th order statistics, the set S is defined as $$S = \{\xi_A : A \subset \{1, 2, \ldots, |M|\}, |A| \le k\}.$$

The partial non-decreasing subset ordering of set S may be represented as $(\xi_1, \xi_2, \ldots, x_{|M|}, \xi_{12}, \xi_{13}, \ldots, \xi_{|M|-1,|M|}, \xi_{123}, \ldots)$ which means first the method includes the status vector corresponding to the first order statistics, then the second order statistics, and so on, till the k-th order statistics.

The list of status vector L may be then defined as:

$$L = (\xi_{12 \ldots |M|}, \xi_{2 \ldots |M|}, \xi_{13 \ldots |M|}, \ldots, \xi_{12 \ldots |M|-1}, \ldots)$$

which means that the first element is the status vector with all zero elements, then the method adds all the vectors with |M|−1 zero elements and only one element that is equal to one and then the method adds all the status vectors with two element of the vector being equal to one end the rest are zero, and so on till the method adds the elements that have only one elements that is equal to zero and the rest are one.

It is noted that such choice of the list L and the representation of the S satisfies the sufficient condition if the necessary condition is also satisfied for the probabilities corresponding to the set S. Hence, the algorithm can provide a solution for any k-order statistics for the disjoint case.

In other words, the choice of the list L means that the method first selects a hidden state with the largest rank and then at each step the method selects another hidden set of the largest rank. This means that if there is another hidden state with the same rank, that hidden state is picked, otherwise the method selects a state with rank that is one degree less than the current rank. The rank of a state is defined as the number of known values, i.e., the values that are one or zero but not x, in the status vectors that denotes the state. Hence, the method starts with the largest rank, that is the vector of all zeros and successively considers a different status vector of an equal rank in the next step or if such status vector does not exist, the method selects the next highest rank status vector.

M-th Order Statistics

For the special case when the M-th order statistics are available, the solution is in fact equal to the input (measurement) states with the same probability and it is a trivial case.

2-th Order Statistics

This case is beneficial for some applications where it is not possible to gather all order statistics due to overhead. It is also beneficial since the problem with the independence assumption is also converted to the same 2-nd order statistic problem for disjoint case.

First, it is known that it is always possible to find a solution for the 2-nd order statistic case based on the mentioned algorithm. Now, the question is if this solution is unique? Is it possible to find other solutions? Is it possible to find all solutions? Is it possible to find the condition for the uniqueness of the solution? Is it possible to find solutions that are optimal in some sense, for example if users are only interested in knowing how many interferes affect each node without actually finding the interference topology? etc.

The method starts by attempting to find all possible solutions. This is somewhat related to the uniqueness of the solution. In fact, the method finds the set of all solutions only if the solution is not unique. It is assumed that two different solutions for the problem exist. This means that there are two different matrices X1 and X2 that satisfy $X_1^T Q_1 X_1 = X_2^T Q_2 X_2$ for some nonzero Q1 and Q2, particularly where all diagonal elements of the matrices Q1 and Q2 are nonzero. This condition in fact can happen. For example:

$$X_1 = \begin{bmatrix} 1 & 1 & 0 \\ 1 & 0 & 1 \\ 0 & 1 & 1 \end{bmatrix} \quad (17)$$

and $$X_2 = \begin{bmatrix} 1 & 0 & 0 \\ 0 & 1 & 0 \\ 0 & 0 & 1 \\ 1 & 1 & 1 \end{bmatrix} \quad (18)$$

and Q1 and Q2 are identity matrices.

Define the vector μA as a vector where the indices in set A are one and the rest of the elements are zero.

The status vectors μA, μB, μC, μA∪B, μB∪C, μC∪A, and μA∪B∪C for three disjoint sets A, B, and C are then considered.

Thus:

$$X_2 = \begin{bmatrix} \mu_A \\ \mu_B \\ \mu_C \\ \mu_{A\cup B\cup C} \end{bmatrix}^T \begin{bmatrix} \mu_A \\ \mu_B \\ \mu_C \\ \mu_{A\cup B\cup C} \end{bmatrix} = \begin{bmatrix} \mu_{A\cup B} \\ \mu_{B\cup C} \\ \mu_{C\cup A} \end{bmatrix}^T \begin{bmatrix} \mu_{A\cup B} \\ \mu_{B\cup C} \\ \mu_{C\cup A} \end{bmatrix}. \tag{19}$$

This means that if in the solution there are three nodes with the states that can be represented by A∪B, B∪C, C∪A with some common probabilities (say with any nonzero probability less than or equal to the minimum of the probability of all three states), they can be replaced by four status vectors A, B, C, A∪B∪C with the same probability.

For short hand notation the combination of the three states is denoted as: A∪B, B∪C, C∪A as AB+BC+CA where AB means the union of the indices A and B and + means and. Similarly, the short hand notation A+B+C+ABC is used to denote the combination of four states A, B, C, A∪B∪C.

The equality in (19) is then indicated as AB+BC+CA=A+B+C+ABC for any three disjoint and nonempty subsets A, B, and C.

In general, the matrix multiplication $X^TQX$ where $$X = \begin{bmatrix} \xi_{A_1} \\ \xi_{A_2} \\ \vdots \\ \xi_{A_K} \end{bmatrix} \tag{20}$$

and Q is a diagonal matrix with $q_i$ in the (i, i)-th position is written in short hand notation as:

$$X^TQX = \sum_{i=1}^{K} q_i \xi_{A_i}^T \xi_{A_i}, \triangleq \sum_{i=1}^{K} q_i A_i \tag{21}$$

where Ai indicates the subset of indices and ξAi denotes the status vector where the elements corresponding to Ai is zero and the rest of the elements are one.

The solution is not necessarily unique. In particular, if the original network could be written as (21) where in the summation there are three subsets Ai, Aj and Ak with nonzero probabilities that can be written in the form of Ai=AB, Aj=BC and Ak=CA for three disjoint subset of A, B, and C, then for any non-negative value $0<\eta\leq\min(q_i, q_j, q_k)$, the factor $\eta(A_i+A_j+A_k)$ can be written in the form of η(A+B+C+ABC). This means that there are continuum of solutions that are all equivalent in the view of 2-nd order statistics available at the measurement nodes.

Figure 5:
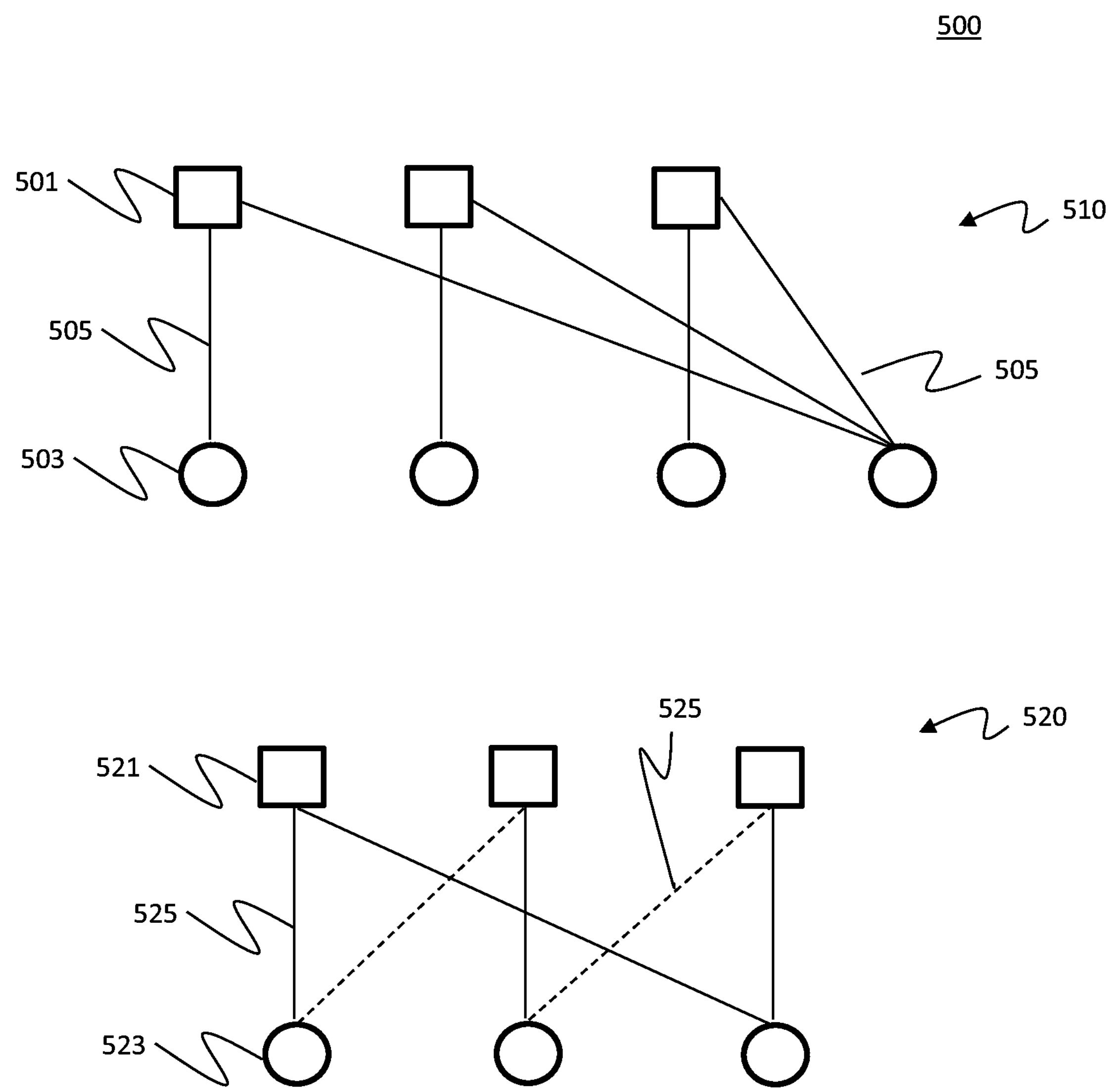
FIG. 5 is a block/flow diagram illustrating a pair of equivalent simple forms, in accordance with embodiments of the present invention.

The solution is now confirmed to be not unique, and the question is: "Is it possible to account for all possible solutions?" To address this question, the notion of a simple form is defined. Any non-trivial and irreducible solution of the homogeneous equation $X_1^TQ_1X_1=X_2^TQ_2X_2$ generates a pair of two equivalent simple forms, one corresponding to the right hand side and one corresponding to the left hand side. Hence, the equality AB+BC+CA=A+B+C+ABC leads to a pair of equivalent simple forms Γ1=AB+BC+CA and Γ2=A+B+C+ABC as the corresponding graphs of these two equivalent simple forms 510, 520 (FIG. 5; 500). The simple form 510 shows a configuration of clients 501 and hidden terminals 503 with communications 505 therebetween. Similarly, simple form 520 shows a configuration of clients 521 and hidden terminals 523 with communications 525 therebetween.

The term "non-trivial" in the definition of the simple form means that there are no equal subsets both in the left hand side and right hand side, e.g., the equations A=A is trivial. Also, by "irreducible" it is meant that any common factors of the same subset from both left hand side or right hand side have been removed, e.g., the equality D+AB+BC+CA=A+B+C+D+ABC or A+AB+BC+CA=2A+B+C+ABC are reducible and they will reduce to AB+BC+CA=A+B+C+ABC.

Another example of a nontrivial and irreducible solution of the homogeneous equation is C+AD+AB+BCD=A+CD+BC+ABD for four disjoint subsets A, B, C, and D. Thus, another pair of simple forms is C+AD+AB+BCD and A+CD+BC+ABD. In fact there are many simple forms, but why are they necessary? It turns out that if the problem $R=X^TQX$ has more than one solution the difference between the solution can always be expressed in terms of simple forms. For example, assume for some R one solution is found as $q_1A+q_2AB+q_2AC+q_3BC$ for some disjoint sets A, B, and C, where $q_3=q_2+q$ for some positive value q. It is argued that all the solutions are then expressed as $(q_1A+q_2AB+q_2AC+q_3BC)+q(A+B+C+ABC)-\eta(AB+AC+BC)=R1+\eta\Gamma2-\eta\Gamma1$ for some value η; $0\leq\eta\leq q2$. There could be an analogy between expressing the solution for the problem at hand and that of differential (or difference) equations where all solutions are expressed as a particular and homogeneous solution. Therefore, finding all the solutions for the problem at hand relies on: (1) the possibility of finding at least one solution that the method showed is always possible to find the solution under a certain condition, and (2) being able to find all possible solutions for the homogeneous problem which in particular means being able to find all possible pairs of simple forms.

Before proceeding to examine the second condition mentioned above, a particular difference in the suggested analogy between the solution of the problem at hand and that of differential equations is noted. In particular it is noted that since all factors, qi, in the summation of $\Sigma_{i=1}^{K}q_iA_i$ have to be positive integer, a pair of equivalent simple forms may be added and subtracted only if they actually exist in the summation with nonzero probability. To be more specific, the definition of the formal projection can be extended to simple forms Γ as the maximum value η such that $\Sigma_{i=1}^{K}q_iA_i-\eta\Gamma$ can be written in the form of $\Sigma_{i=1}^{K}q_i'A_i$ for some non-negative values $q_i'$ and it is written as:

$$\eta \triangleq \mathbb{P}_\Gamma\left(\sum_{i=1}^{K} q_i A_i\right). \tag{22}$$

Based on the notion of the formal projection, the solution may be altered only if there exists a simple form Γ for which the formal projection is nonzero. Otherwise it is not possible to alter the solution and the solution is unique. To this end, all possible simple forms need to be found. In the following, it is revealed that even though there are infinitely many simple forms, but all of them may be generated from a single pair of basic form which is nothing but Γ1 and Γ2. Hence, the pair of (Γ1, Γ2) is called as basic simple forms.

The following example illustrates how a pair of simple forms can be found based on the basic simple forms even though at the first glance the relation between them is not obvious.

Consider the example of a pair of simple forms as C+AD+AB+BCD=A+CD+BC+ABD. It is assumed that a solution to some problem is given by R=C+AD+AB+BCD+B+ABCD for four disjoint subsets A, B, C, and D. Since AD, B, and C are also disjoint, their basic simple form equation can be written as ADB+BC+CDA=AD+B+C+ABCD. Hence, R=(AD+B+C+ABCD)+AB+BCD=(ADB+BC+CDA)+AB+BCD. On the other hand, A, B, and CD are also disjoint, hence the equation between their corresponding basic simple forms can be written as AB+BCD+CDA=A+B+CD+ABCD.

Therefore, R=(ADB+BC+CDA)+AB+BCD=ADB+BC+(CDA+AB+BCD)=ABD+BC+A+B+CD+ABCD. Comparing the last equation for R with the definition of R, then C+AD+AB+BCD+B+ABCD=ABD+BC+A+B+CD+ABCD and after reducing the terms ABCD and B from both sides of the equation the equality to be proved has been achieved.

Now, the question is 'if' and 'how' can the method show all simple forms are derived from the basic simple forms? Essentially, the proof lies in the same line of the way that the above example was worked out. So, the method adds different terms in both sides of the equation using only basic simple forms and then the method uses a reduction step to remove similar subset of indices that are present in both sides and then continue with another addition step and next reduction step and so on.

It is assumed that an equivalent pair of basic forms are given as $\theta_1 \triangleq \Sigma_{i=1}^{K} q_i A_i = \theta_2 \triangleq \Sigma_{i=K+1}^{N} q_i A_i$.

Note that since two sides of the equation are reduced, it means that any set Ai can exist in one side only. Between all sets Ai in both sides select the one, say Ak with the largest rank, i.e., with the maximum number of elements. If the number of elements is more than three, then perform an arbitrary partitioning of this set into three subsets such that none is empty and call these subsets A, B and C.

Consider the relation between the basic simple forms of these three subsets, then AB+BC+CA=A+B+C+ABC. Add the basic form $_{q_k}$(AB+BC+CA) in the side that Ak was seelcted from and the basic form $q_k$(A+B+C+ABC)=$q_k$(A+B+C+Ai) in the other side. Now, the reduction step is applied.

Ai from both sides of the equality will be reduced and hence disappear. Some other factors may also be reduced. As a result of these two steps, the term with the maximum rank is broken down since all other subsets A, B, C, AB, AC, and BC are at least one rank less than $A_k$. If this procedure is repeated, the end of both sides of the equation must have only sets that are not more than rank 2 and they cannot be broken down anymore.

It can be argued that under this condition, both sides have to be zero since under 2-nd order statistics it is not possible to find two basic forms that the rank of their largest set is less than three. To be more precise, by "largest set," it is meant the set among the factors of the simple form that has the largest size. Therefore, it has been established that any pair of simple form can be derived from the basic simple form.

As a consequence, the following results are achieved.

The solution X and its associated probabilities Q to the 2-nd order statistic problem of $R=X^TQX$ for a given R is unique if and only if the formal projection of the solution to any basic simple forms is zero.

It is noted that in many cases this condition in fact is true, e.g., consider the case that there is a single hidden node present or any combination of the hidden nodes with rank less than 3 appear in the solution. There are still many examples with higher order hidden nodes that can satisfy the condition in the theorem.

Any two arbitrary solutions X1 and X2 and their associated probabilities Q1 and Q2 to the 2-nd order statistic problem of $R=R=X^TQX$ or a given R have a difference that can be expressed as a linear combination of some basic simple forms. Moreover, the sum of the formal projection of each either solution to each pair of basic forms has to be equal for both sides and the projection to each basic form in each side has to be nonnegative. The above theorem actually states how to find all possible solutions by expressing the relation between any two arbitrary solutions.

In some applications, the focus of the solution is on the degree of interference at each measurement node. In other words, the number of the edges that arrive to a given node irrespective from which set of hidden node they are occurring.

The set of all solutions can be found by linear additions (and proper subtractions) of simple forms for the simple forms where the solutions have nonzero projections into them. Therefore, if both simple forms are kept in an equivalent pair of simple forms in the solution by some nonzero probability, the solution has the same degree at all measurement nodes even though the probability of the hidden nodes are not the same as the probability of the original set of hidden nodes. On the other hand, there are cases where the original set of hidden nodes do not have projections into both simple forms that belong to an equivalent pair of simple forms. Nonetheless, considering that the probability of having projection into both simple forms takes its value from a real interval, the probability of having zero projection into one of the simple forms in a pair is zero with respect to the probability that both exist in the final solution.

Henceforth, if after finding a solution and all possible simple forms that are a factor of the solution, (i.e., the solution has nonzero projection on them,) the final solution is expressed such that the formal projection into either simple forms that belong to an equivalent pair is nonzero, the probability of having found a solution with exact degree at all measurement nodes is equal to one.

Therefore, in conclusion, in order to deliver the concurrency gains through intelligent, over-scheduling of clients in LTE base stations, the knowledge of the interference topology and its associated probability of interfering node being active is necessary. The exemplary embodiments address the problem of topology inference in a bipartite graph of communication nodes between a measurement node set and a hidden node set. The measurement nodes are the ones whose status (ability to transmit without hearing interference in the same frequency band) could be available for some combination of the nodes. The hidden nodes and the probability of their occurrence as well as the network topology is unknown. The exemplary methods provide a full solution for the problem under two models on the joint probability of the hidden nodes: The independent assumption and the disjoint assumption. The independent assumption can be interpreted as the case that hidden nodes are in different contention domain and the disjoint case could represent the case that all hidden nodes are in the same contention domain.

Figure 6:
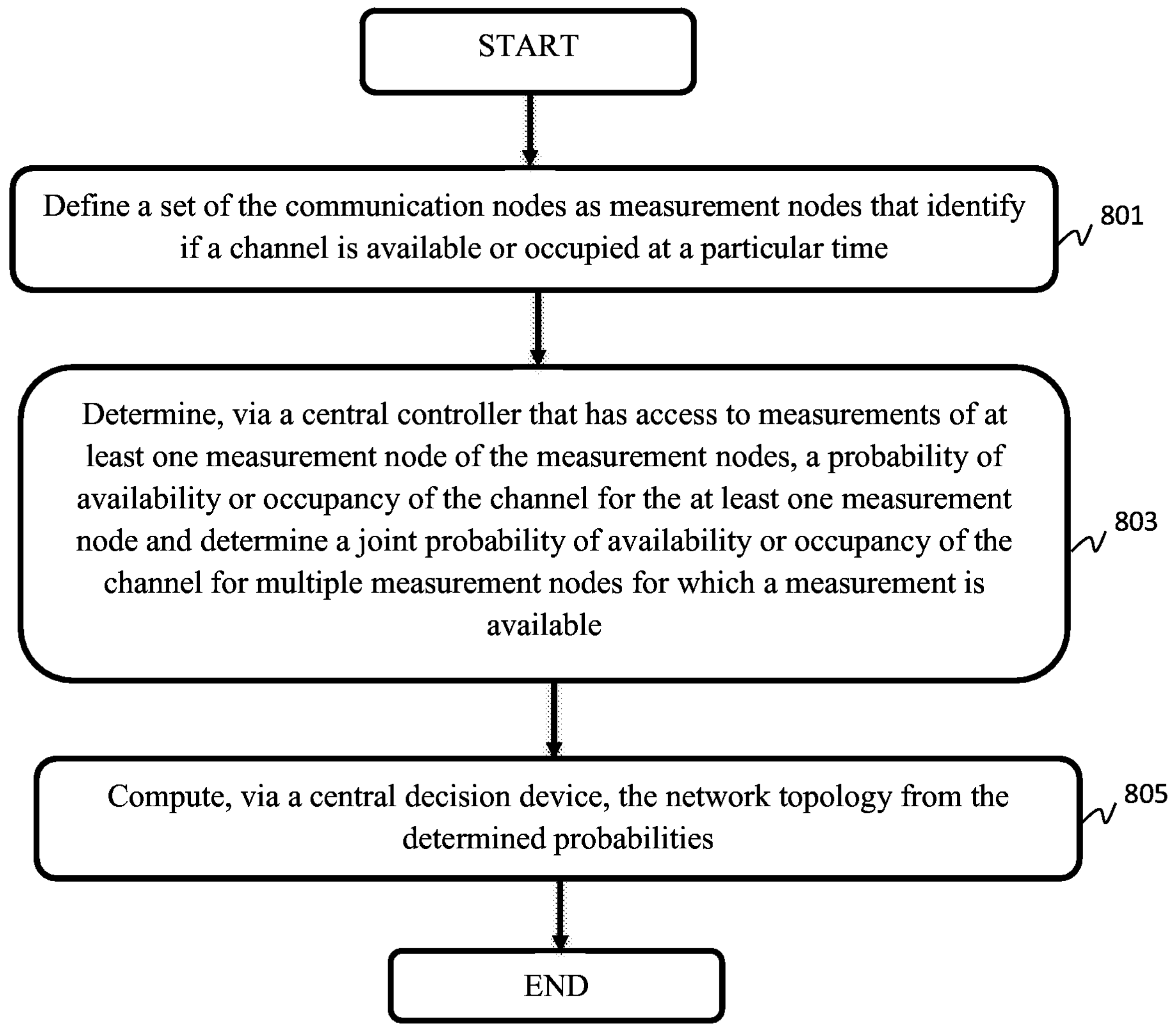
FIG. 6 is block/flow diagram of an exemplary method for finding a topology of a network of communication nodes, in accordance with embodiments of the present invention.

FIG. 6 is block/flow diagram illustrating a method for achieving a smooth PV output profile, in accordance with embodiments of the present invention.

At block 801, define a set of the communication nodes as measurement nodes that identify if a channel is available or occupied at a particular time.

At block 803, determine, via a central controller that has access to measurements of at least one measurement node of the measurement nodes, a probability of availability or occupancy of the channel for the at least one measurement node and determine a joint probability of availability or occupancy of the channel for multiple measurement nodes for which a measurement is available.

At block 805, compute, via a central decision device, the network topology from the determined probabilities.

Figure 7:
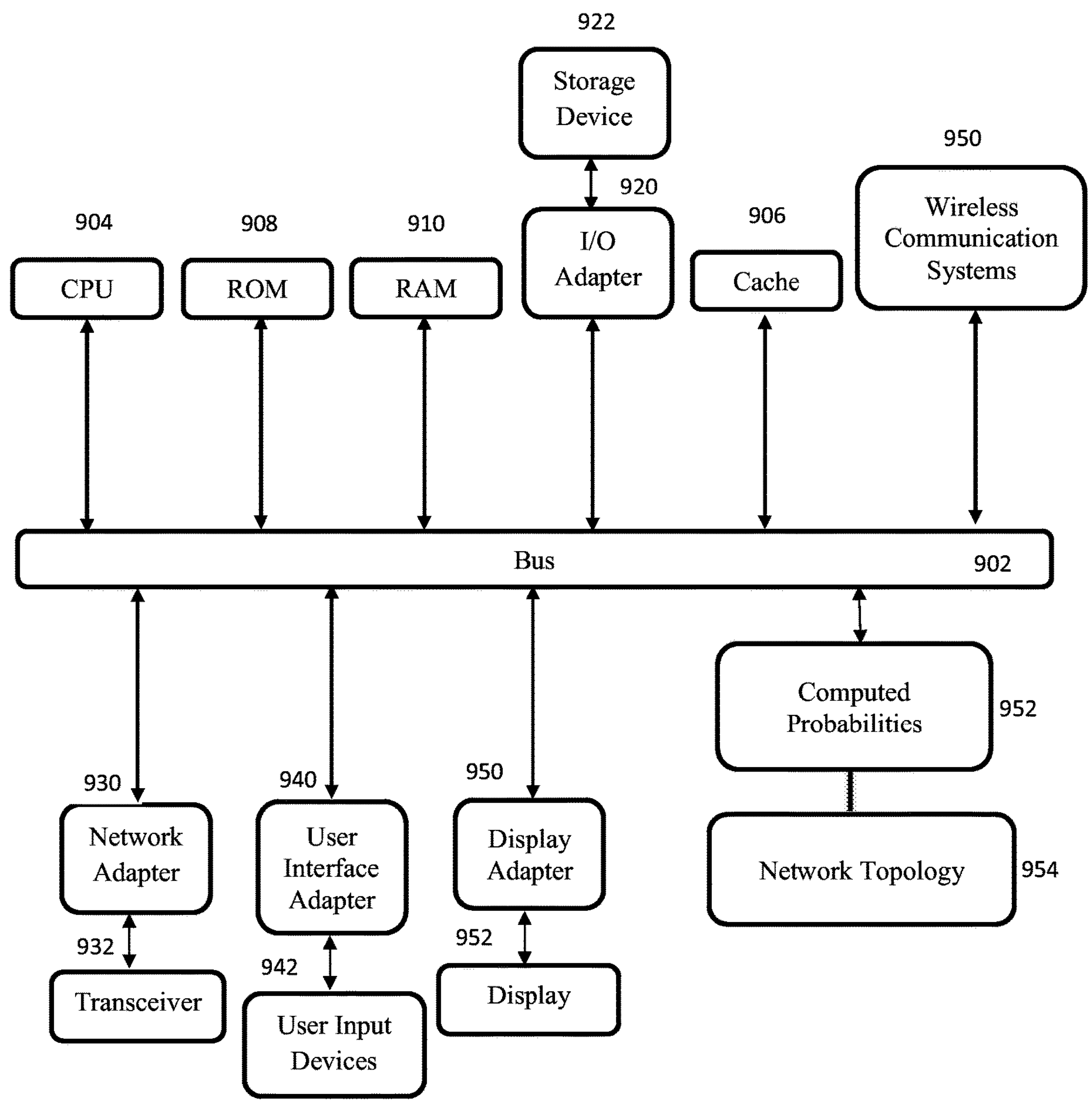
FIG. 7 is a block/flow diagram of an exemplary LTE processing system, in accordance with embodiments of the present invention.

FIG. 7 is a block/flow diagram of an exemplary processing system, in accordance with embodiments of the present invention.

The processing system includes at least one processor (CPU) 904 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a power management system 950 is operatively coupled to the system bus 902. Wireless communication systems 950 can be connected to the bus 902. This enables computing probabilities 952 to find a network topology 954.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively oupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
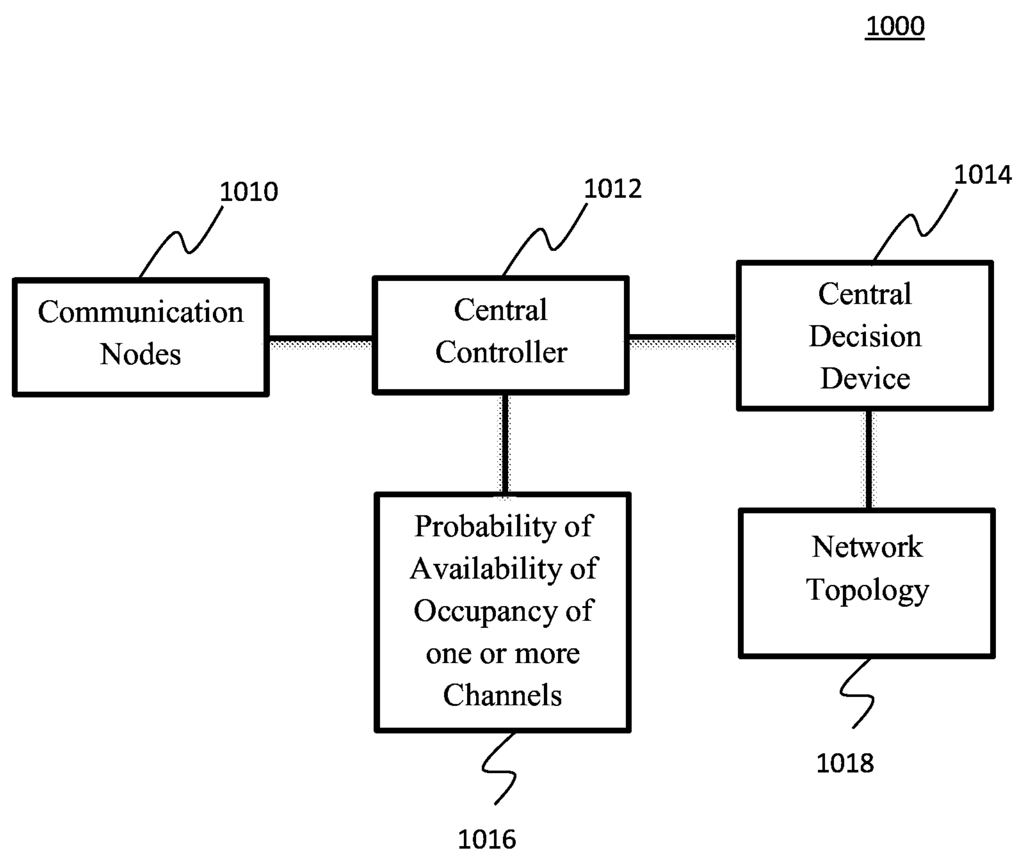
FIG. 8 is a block/flow diagram of an exemplary wireless communication system for finding a topology of a network of communicating nodes, in accordance with embodiments of the present invention.

FIG. 8 is a block/flow diagram of an exemplary wireless communication system for finding a topology of a network of communicating nodes, in accordance with embodiments of the present invention.

The wireless system 1000 includes communication nodes 1010 defined as measurements nodes that are processed by a central controller 1012. The central controller 1012 computes or determine probabilities of availability or occupancy 1016 of one or more channels. Then a central decision device 1014 computes the network topology 1018 from the determined or computed probabilities 1016.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method implemented in wireless communication systems for finding a topology of a network of communication nodes, the method comprising:

defining a set of the communication nodes as measurement nodes that identify if a channel is available or occupied at a particular time;

determining, via a central controller that has access to measurements of at least one measurement node of the measurement nodes, a probability of availability or occupancy of the channel for the at least one measurement node and determining a joint probability of availability or occupancy of the channel for multiple measurement nodes for which a measurement is available; and computing, via a central decision device, the network topology from the determined probabilities.

2. The method of claim 1, wherein the network is modeled as a bi-partite graph between two sets of nodes: the measurement nodes and hidden nodes, where the central decision device computes which of the hidden nodes generate interference at the measurement nodes.

3. The method of claim 2, wherein the central decision device computes a probability of a hidden node being in an active state.

4. The method of claim 2, wherein the hidden nodes are located in one contention domain.

5. The method of claim 2, wherein the hidden nodes are located in different contention domains.

6. The method of claim 1, wherein first and second order statistics are available.

7. The method of claim 1, wherein the measurements are available for a subset of the measurement nodes that are denoted by partial status types.

8. The method of claim 7, wherein the partial status types are partially ordered such that if a first status type is a subset of a second status type, the first status type precedes the second status type in the order.

9. The method of claim 7, wherein a probability of a second status type is not more than a probability of a first status type if the first status type precedes the second status type.

10. The method of claim 7, wherein a rank of a status type is a size of a measurement set that defines the status type.

11. The method of claim 10, wherein the central decision device successively selects a status type with largest rank and removes its probability from remaining status types in the measurement set.

12. The method of claim 1, wherein the central decision device transforms a problem for when hidden nodes are in different contention domains into an equivalent problem for which nodes are all in one contention domain.

13. The method of claim 1, wherein, when an interference topology for a client associated with a long term evolution (LTE) base station is found, scheduling of clients is modified accordingly.

14. The method of claim 13, wherein the LTE base station operates some clients in an unlicensed spectrum and interference for the clients from hidden nodes are estimated.

15. The method of claim 13, wherein over-scheduling is employed when a multi-user scheme is used.

16. A wireless communication system for fining a topology of a network of communication nodes, the system comprising:

a set of the communication nodes defined as measurement nodes that identify if a channel is available or occupied at a particular time;

a central controller that has access to measurements of at least one measurement node of the measurement nodes, the central controller determining a probability of availability or occupancy of the channel for the at least one measurement node and determining a joint probability of availability or occupancy of the channel for multiple measurement nodes for which a measurement is available; and a central decision device that computes the network topology from the determined probabilities.

17. The wireless communication system of claim 16, wherein the network is modeled as a bi-partite graph between two sets of nodes: the measurement nodes and hidden nodes, where the central decision device computes which of the hidden nodes generate interference at the measurement nodes.

18. The wireless communication system of claim 17, wherein the central decision device computes a probability of a hidden node being in an active state.

19. The wireless communication system of claim 18, wherein the measurements are available for a subset of the measurement nodes that are denoted by partial status types.

20. A non-transitory computer-readable storage medium comprising a computer-readable program for fining a topology of a network of communication nodes, wherein the computer-readable program when executed on a computer causes the computer to perform the steps of:

defining a set of the communication nodes as measurement nodes that identify if a channel is available or occupied at a particular time;

determining, via a central controller that has access to measurements of at least one measurement node of the measurement nodes, a probability of availability or occupancy of the channel for the at least one measurement node and determining a joint probability of availability or occupancy of the channel for multiple measurement nodes for which a measurement is available; and computing, via a central decision device, the network topology from the determined probabilities.

* * * * *